UNITED STATES PATENT OFFICE.

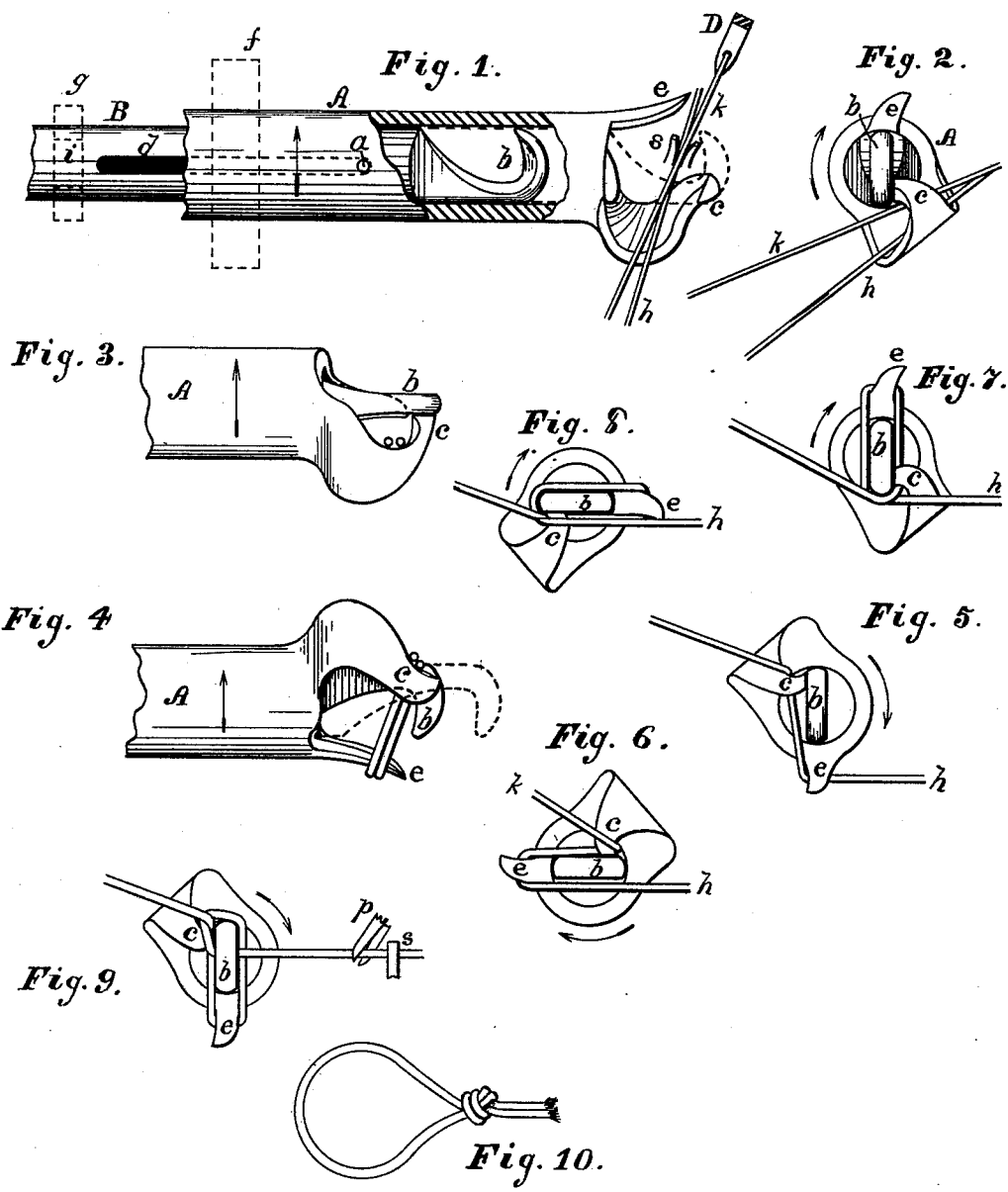

FRANCIS W. RANDALL, OF TEKONSHA, MICHIGAN.

KNOT-TYER FOR GRAIN-BINDERS.

SPECIFICATION forming part of Letters Patent No. 231,448, dated August 24, 1880.

Application filed March 3, 1880. (No model.)

*To all whom it may concern:*

Be it known that I, FRANCIS W. RANDALL, of Tekonsha, in the county of Calhoun and State of Michigan, have invented a new and useful Improvement in Knot-Tyers for Grain-Binders, which improvement is fully set forth in the following specification and accompanying drawings.

The object of my invention is to produce a novel device for tying a knot in a twine band put upon a gavel of grain; and it consists of a metallic tube provided at one of its ends with two curved prongs, which, as the tube is rotated, operate upon the twine in such a manner as to form a loop, while a hook moving longitudinally within the tube is caused to make two distinct advance movements at intervals, and thus draw the ends of the band through the loop and complete the knot, the device being more fully set forth hereinafter, and shown in the accompanying drawings, in which—

Figure 1 is a side general view of the device, the tube being partially broken away at one side to uncover the contained hook. Figs. 2 to 9, inclusive, show different positions of the same, and Fig. 10 is a completed knot.

This tying device is designed to be used upon an automatic twine grain-binding harvester in combination with some suitable gaveler, binder-arm, twine-clamping jaws, and shears, and is placed horizontally or otherwise in such relation to the binding-arm and clamping-jaws that the twine shall be brought by the former within its reach for the purpose of being knotted after having been carried around the gavel.

The part A of the drawings represents a straight tube having fitted within it a rod, B, formed at one end into a hook, $b$. This rod is slotted at $d$, and a pin, $a$, passes through both sides of the tube and through the slot, which pin prevents the rod from rotating independently of the tube, while it may slide longitudinally to the extent of the length of the slot. The respective ends of the slot come in contact with the pin as the rod is caused to slide one way or the other, and form stops for the same.

The tube, at its end, is divided and formed on one side into a curved twine-looping prong or looper, $c$, and on the other into a twine-holding finger or twine-holder, $e$, the former being bent inward and the latter slightly outward, as shown. To form the knot the tube is rotated in the direction indicated by the arrows by means of a gear, $f$, fastened upon it, or by some other suitable means, and the rod B is caused to slide endwise within the tube at proper times with reference to the rotation of the same by means of a lever, $g$, (shown in dotted lines,) forked upon said rod, the jaws of which lever rest in a groove, $i$, or by some other suitable means suggested by mechanical skill.

The normal position of the hook $b$ is within the tube, as shown in full lines in Fig. 1; but the hook also occupies two other positions during the process of developing the knot, one of which is shown by dotted lines in Fig. 1 and in full lines in Figs. 3 and 4, and the other in dotted lines in the latter figure.

As shown in Figs. 1 and 2, the tying device is at rest with the two ends of the band—one, $h$, held by the twine-clamps $s$, and the other, $k$, returned by the binder-arm to said clamps—lying within the looper $c$, ready for the operation of tying the knot. The extreme end of the looper is turned inward in such a manner that when the hook $b$ is slid out to its second position, above mentioned, (shown in dotted lines in Fig. 1,) the side of said hook will rest against the end of the looper, as shown in Fig. 3, which prevents the escape of the strands of the band from the looper while the loop is being formed. This motion of the hook takes place immediately after the binding-arm brings the second twine within the looper and clamps $s$, and simultaneously with or before the commencement of the rotation of the tube.

Fig. 3 shows the tyer when it has rotated one-fourth, and Figs. 4 and 5 when it has rotated one-half, around, the twine-holder $e$ having caught the twine, as shown. As a matter of convenience but a single strand of the band is shown in several of the figures. Figs. 6 and 7 respectively show the positions of the parts when the knotter has made three-fourths of and a complete rotation. Soon after the former position is passed the twine $k$, leading from the gavel, slips off the end of the looper and over the end of the hook, which it may easily do as the said ends of the looper and hook are even, immediately after which the hook is advanced to its third or outermost position, (shown in dotted lines in Fig. 4,) the twine being now held around the back side of the hook and the outside of the holder e, as shown in Fig. 7.

Fig. 8 represents the knotter after having rotated once and one-fourth around, the twine-holder e being about to pass back of or beneath the twine h, which it can easily do, as it is shorter than the looper. The said twine h is now held out at the extreme end of the looper owing to the position of the parts. The loop for the knot is completed when the tube rotates another one-fourth, or once and one-half around in all, as shown in Fig. 9, the part of the band leading from the clamping-jaws s being brought by the last quarter-rotation within the hook b. If the twine be now cut between the knotter and the clamping-jaws by some suitable cutting device p, and the hook drawn back within the tube, the severed ends of the twine will be drawn through the loop, which completes the knot, it being observed that as the hook is drawn back past the point of the looper the twine, which up to this stage of the operation has been confined within said looper by the presence of the hook, as before mentioned, is released and the weight of the bound bundle easily takes the knot off the twine-holder e and assists in drawing said knot tight, which knot completed is represented in Fig. 10.

After the sheaf has been delivered from the knotter the latter is rotated one-half farther around, making two complete rotations, which movement returns it to its first position, (shown in Fig. 1,) ready to receive the twine and repeat the operation of tying a knot.

A knot-tying device consisting of a rotating tube formed at its end into prongs for acting upon the twine and containing a longitudinally-sliding hook to draw the end of the twine through a loop formed of the twine to form a knot is not new, I having shown and described such device in my patent dated April 1, 1879, No. 213,838.

The looping-prong in my present invention turns at its extremity in a direction at right angles with the axis of the tube, and reaches to but does not cross or overreach the path of the hook, it being just out of the way of the hook, as the latter passes and repasses it during the motion of the hook, above mentioned. It is this formation of the prong and conjoint operation of the hook that constitute the essential part of my invention.

I claim as my invention—

The combination of a tube or hook-case, A, and hook b, the former provided with prongs e and c, the latter prong being turned at its extremity, so as to reach the path of the hook, said hook being caused at intervals to make two distinct advance movements, the first to and the second thence by and beyond the point of the prong c.

FRANCIS W. RANDALL.

Witnesses:
C. D. DEWEY,
WM. B. SYLVESTER.